(12) United States Patent
Breton

(10) Patent No.: US 7,832,814 B2
(45) Date of Patent: Nov. 16, 2010

(54) SNOW AND DEBRIS DEFLECTOR FOR A TRACK SYSTEM

(75) Inventor: Rémi Breton, Drummondville (CA)

(73) Assignee: Soucy International Inc., Drummondville, QC (CA)

( * ) Notice: Subject to any disclaimer, the term of this patent is extended or adjusted under 35 U.S.C. 154(b) by 0 days.

(21) Appl. No.: 11/949,248

(22) Filed: Dec. 3, 2007

(65) Prior Publication Data

US 2008/0150355 A1 Jun. 26, 2008

Related U.S. Application Data

(63) Continuation-in-part of application No. 11/142,414, filed on Jun. 2, 2005, now abandoned.

(51) Int. Cl.
B62D 25/16 (2006.01)
(52) U.S. Cl. ........................................ 305/110; 305/107
(58) Field of Classification Search .................. 305/100, 305/107, 108, 109, 110, 115, 116, 194; 404/129; 172/606; 280/855, 856, 847, 848, 851; 301/36.3
See application file for complete search history.

(56) References Cited

U.S. PATENT DOCUMENTS

| 1,992,702 | A | | 2/1935 | Koop |
| 2,560,307 | A | | 7/1951 | Slemmons |
| 3,112,942 | A | * | 12/1963 | Uadiski ........................ 291/41 |
| 3,582,108 | A | * | 6/1971 | Carlton ........................ 280/851 |
| 3,976,337 | A | | 8/1976 | Vaughn |
| 4,198,103 | A | | 4/1980 | Ward et al. |
| 4,235,479 | A | | 11/1980 | Puglise |
| 4,531,787 | A | | 7/1985 | Hart et al. |
| 4,763,961 | A | | 8/1988 | Parrot |
| 5,005,922 | A | | 4/1991 | Edwards et al. |
| 5,697,683 | A | | 12/1997 | Arulandu et al. |
| 5,725,292 | A | | 3/1998 | Keedy et al. |
| 6,267,458 | B1 | | 7/2001 | Hansen et al. |
| 7,097,208 | B2 | * | 8/2006 | Maurer et al. ............... 280/851 |
| 2005/0127751 | A1 | | 6/2005 | Bedard |

FOREIGN PATENT DOCUMENTS

| JP | 4103477 | 4/1992 |
| JP | 2001-138965 | 5/2001 |
| SU | 1751035 A1 | 7/1992 |
| WO | WO 8301234 A1 * | 4/1983 |

* cited by examiner

*Primary Examiner*—S. Joseph Morano
*Assistant Examiner*—Kip T Kotter
(74) *Attorney, Agent, or Firm*—Brouillette & Partners; François Cartier; Robert Brouillette

(57) ABSTRACT

A deflector for reducing the ingestion of snow and/or other debris in one of the sprocket wheel and the idler wheel area of a vehicle equipped with endless tracks is provided. The deflector generally comprises a rigid plate associated with the vehicle and positioned near the sprocket wheel or the idler wheel thereof, and a resilient pad having an upper portion coupled with the rigid plate and a lower portion freely extending from the upper portion and extending toward the inner surface of the track to limit the ingestion of snow and/or other debris in the sprocket wheel or idler wheel area of the vehicle during its operation. The lower portion of the resilient pad is generally provided with reinforcing elements which allow the resilient pad to be essentially rigid in the direction of ingestion yet pivotable in the opposite direction.

28 Claims, 14 Drawing Sheets

FIG_1

FIG_3

FIG_4

FIG_6

FIG_12

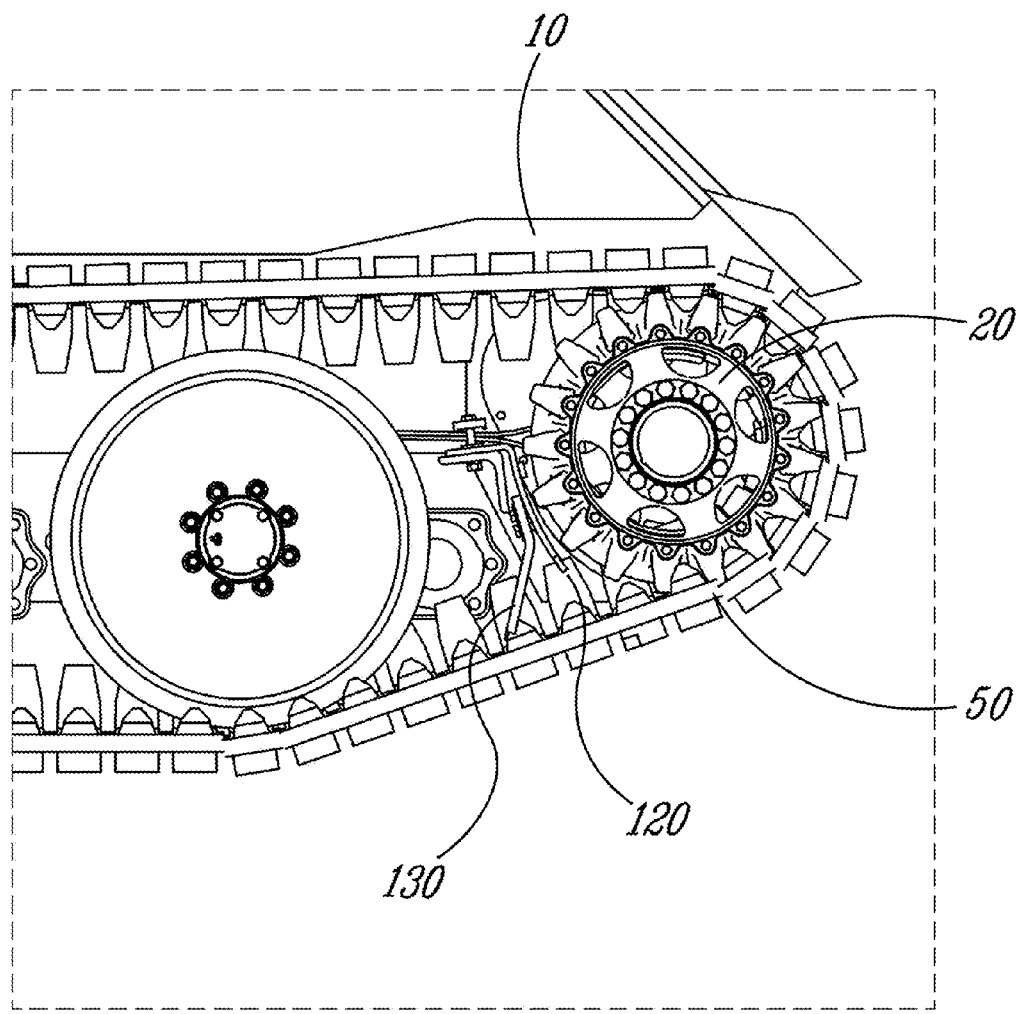
FIG_14

SNOW AND DEBRIS DEFLECTOR FOR A TRACK SYSTEM

CROSS-REFERENCE TO RELATED APPLICATIONS

The present patent application is a continuation-in-part of commonly assigned U.S. patent application Ser. No. 11/142,414 Jun. 2, 2005, now abandoned and claims the benefits of priority thereof. The disclosure of U.S. patent application Ser. No. 11/142,414 is incorporated herein by reference.

FIELD OF THE INVENTION

The present invention generally relates to tracked vehicles, such as, but not limited to, construction vehicles, agricultural vehicles and military vehicles. More specifically, the present invention relates to devices and systems that deflect and generally prevent the ingestion of snow and/or other debris (e.g. ice, mud, soil, gravel, rock and the like) in the sprocket wheel or idler wheel area of such tracked vehicles during operation thereof.

BACKGROUND OF THE INVENTION

Conventionally, a tracked military vehicle comprises a set of five or six wheels on each side of the vehicle over which an endless track runs. The suspension of the wheels is independent. The system also comprises a sprocket wheel and an idler wheel, respectively disposed at each end of the vehicle and generally above the ground. The way the track engages the sprocket wheel and/or the idler wheel makes it prone for the ingestion of snow, soft soil, mud, gravel, ice or other debris. The small angle formed by the track will cause such debris to fall in, follow the track and then be ingested by the sprocket wheel or the idler wheel, especially when making small radius turn manoeuvres. For example, a conventional front drive vehicle will ingest debris in the sprocket when turning in backward motion, and ingest debris in the idler when turning in forward motion.

This ingestion will typically create over-tension in the track system and eventually create failures especially when an elastomeric track is used. It can also make the track touch the sponson and squeeze and/or damage certain components, or even force the track to fall off the wheels.

Devices and systems devised to solve this problem have been proposed in prior art patents.

U.S. Pat. No. 1,992,702 issued to Koop on Feb. 26, 1935, disclosed a dirt guard which is adapted to be installed in parallel to the longitudinal direction of the track. The dirt guard includes a rubber strap in contact with the inner surface of the lower run portion of the track, preferably near the lateral edge thereof. Normally, a dirt guard is installed on each side of the track. While the dirt guard generally prevents debris from falling onto the inner surface of the track, it remains that it does not prevent those debris from being ingested into the sprocket wheel or idler wheel of the vehicle if they do fall onto the inner surface of the track.

U.S. Pat. No. 4,763,961 issued to Parrot on Aug. 16, 1988, disclosed a debris removal apparatus which includes a hydraulically-operated pusher plate to push debris out of a track system and therefore prevent the accumulation and packing of such debris. Still, while the apparatus is suitable for the particular purpose which it addresses, it remains that the apparatus is very complex and also inefficient when not activated. Indeed, unless the pusher plate is actuated, debris can and will accumulate in the track system.

As seen from the foregoing, there is a need for a snow and debris deflector for a track system which is simple yet efficient.

OBJECTS OF THE INVENTION

Accordingly, an object of the present invention is to provide a snow and debris deflector for a track system that obviates or at least mitigates the above-mentioned disadvantages.

Another object of the present invention is to provide a snow and debris deflector for a track system which reduces the ingestion of snow and/or debris in the sprocket wheel or idler wheel area of a vehicle equipped with endless tracks.

Still another object of the present invention is to provide a snow and debris deflector for a track system which is simple in design and yet effective in operation.

A further object of the present invention is to provide a snow and debris deflector that will deflect snow and/or other debris while not causing any damage to the track.

Still a further object of the present invention is to provide a snow and debris deflector which can be easily repaired or replaced.

One more object of the present invention is to provide a snow and debris deflector for a track system which allows continuity of cleaning action.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

To attain these and other objects which will become more apparent as the description proceeds according to one aspect of the present invention, a snow and debris deflector for a track system is provided.

The main purpose of this invention is to limit the ingestion of snow and/or other debris such as, but not limited to ice, mud, gravel, soil, rock and the like (hereinafter "debris"), in the sprocket wheel or idler wheel area of the track system of a tracked vehicle. By reducing or limiting the ingestion of snow and/or debris, the deflector of the present invention significantly reduces the build up of snow and/or debris between the sprocket wheel and the track or between the idler wheel and the track. Additionally, by reducing the ingestion of snow and/or debris in the in the sprocket wheel or idler wheel areas of the track system, the deflector considerably diminishes the amount of tension created in the track and also generally prevents the track from touching the sponson of the vehicle. In turn, this generally prevents the track from falling off the wheels of the vehicle; an event generally referred to as de-tracking.

According to the present invention, the deflector generally comprises a generally rigid plate and a generally resilient pad mounted thereto. More particularly, the rigid plate of the deflector is generally mounted to the vehicle and positioned in a relatively close proximity to the sprocket wheel or idler wheel of the track system. The rigid plate, which generally defines a lower edge, also defines a generally inner wheel-facing side and an outer side. For its part, the resilient pad comprises an upper portion, adapted to be mounted on the outer side of the rigid plate, and a lower portion, extending freely and downwardly from the upper portion, beyond the lower edge of the rigid plate and toward the inner surface of the track.

In accordance with the present invention, the lower portion of the resilient pad is generally provided with one or more rigid and generally vertically extending reinforcing elements which are preferably embedded therein. The reinforcing elements generally extend in the lower portion of the pad and thus, above and under the lower edge of the rigid plate. The reinforcing elements are preferably laterally spaced apart within the resilient pad. In addition, the reinforcing elements may have different lengths; the present invention is not so limited.

In operation, the disposition of the reinforcing elements in the resilient pad and the mounting of the resilient pad with respect to the rigid plate will define a hinge-like portion which will allow the resilient pad to be substantially rigid in the direction of ingestion, but generally flexible or pivotable in the other direction. Hence, by being rigid in the direction of ingestion but pivotable otherwise, the deflector of the present invention will effectively deflect snow and/or debris without hindering or damaging the track or its inner surface.

Preferably, at least part of the rigid plate is shaped as an arc in order to follow the curvature of the outer periphery of the sprocket wheel or of the idler wheel. Preferably, the rigid plate is designed and positioned to avoid interferences with the outer periphery of the sprocket wheel or idler wheel and with the inner surface of the track. Accordingly, the rigid plate is preferably spaced from the outer periphery of the sprocket wheel or idler wheel by a distance ranging between 0.5 inch and 1.5 inch. Additionally, the lower edge of the rigid plate generally has a shape which is preferably complementary to the shape of the inner surface of the track; the present invention is however not so limited.

Preferably, the resilient pad is made from molded composite and/or elastomeric material such as, but not limited to, rubber. Other material exhibiting similar properties could also be used. Additionally, the lower portion of the resilient pad is preferably shaped to be generally complementary with the shape of the inner surface of the track.

Preferably, the deflector is mounted to the vehicle substantially transversely with respect to the longitudinal direction of the endless track.

The invention accordingly comprises the further constructions, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 14 is a fragmentary and enlarged side view of the front snow and debris deflector shown in FIG. 13 when the suspension system of the road wheels is in compressed position,

DETAILED DESCRIPTION OF THE PREFERRED EMBODIMENT

Figure 1:
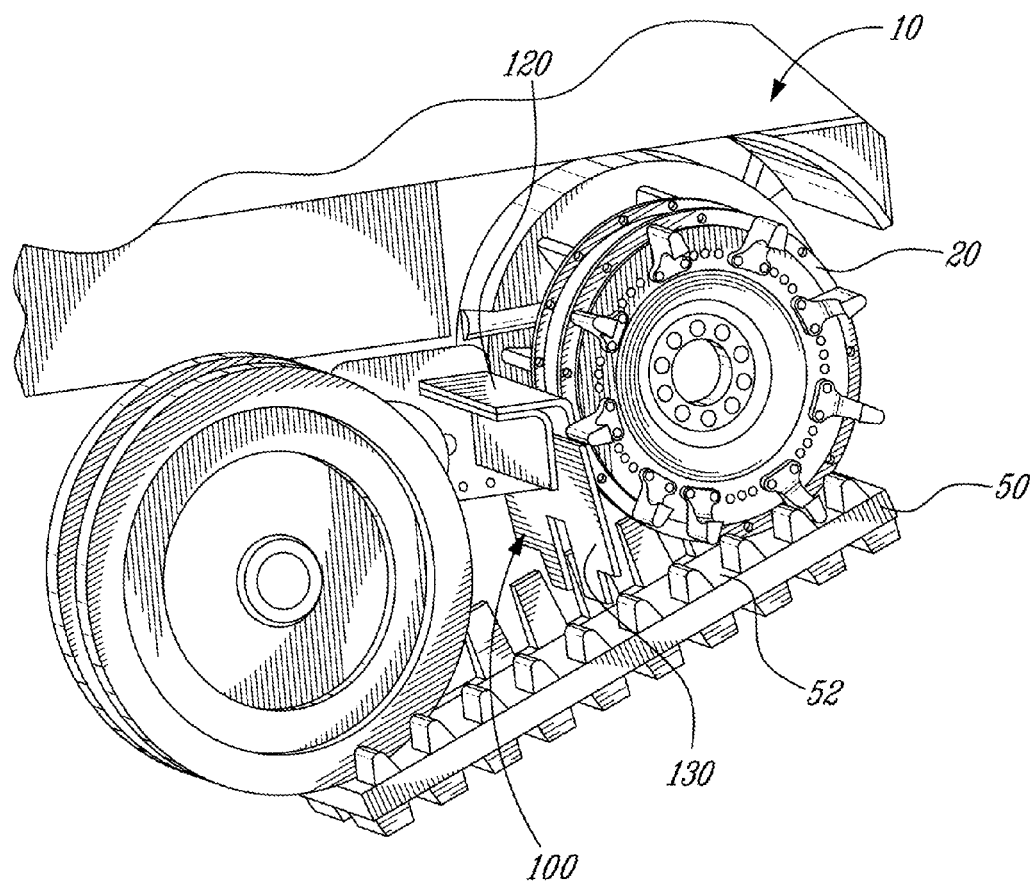
FIG. 1 is a fragmentary isometric side view of a snow and debris deflector according to the present invention, installed about a sprocket wheel.
Figure 2:
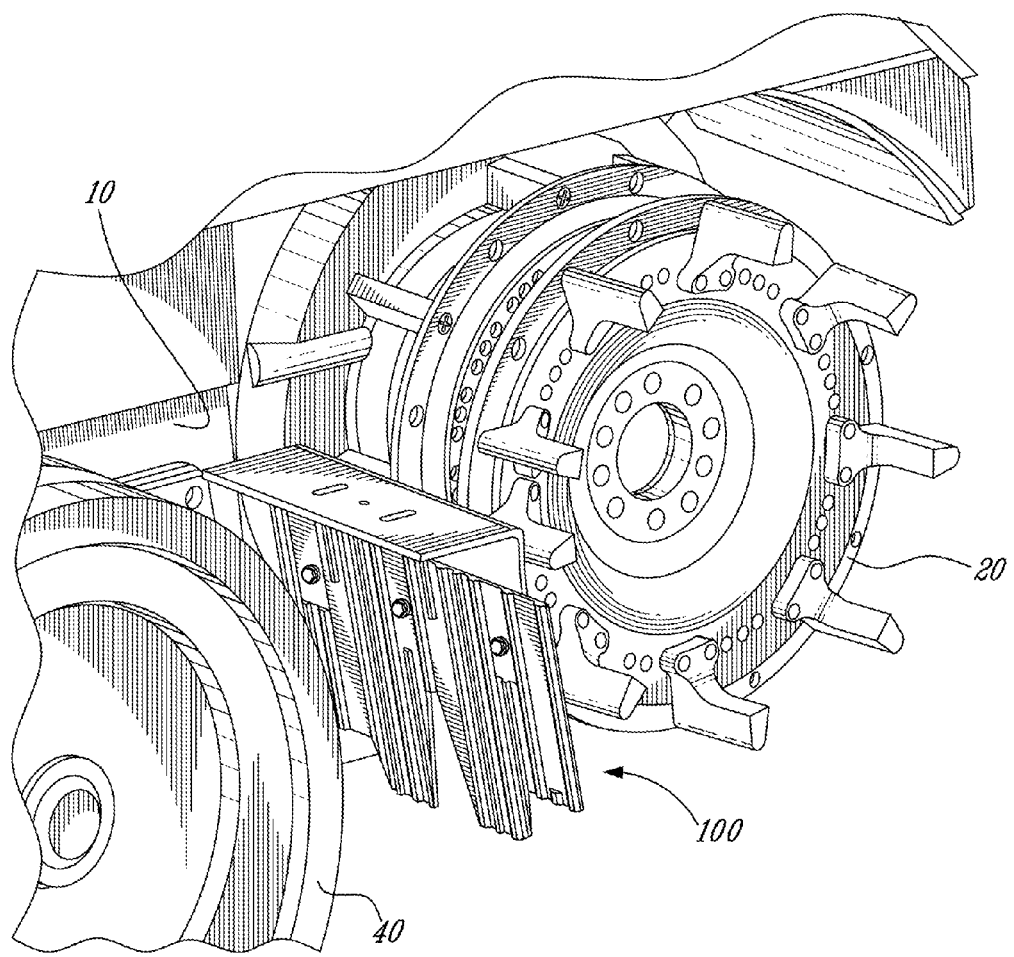
FIG. 2 is an enlarged fragmentary isometric side view of the snow and debris deflector of FIG. 1.

A novel snow and debris deflector will be described hereinafter. Although the invention is described in terms of specific illustrative embodiments, it is to be understood that the embodiments described herein are by way of example only and that the scope of the invention is not intended to be limited thereby.

FIGS. 1 to 4 show a snow and debris deflector 100 for a track system that reduces the ingestion of snow and/or debris in a sprocket wheel 20 or idler wheel 30 (see FIG. 7) area of a vehicle 10 equipped with tracks 50.

The deflector 100 generally comprises a rigid plate 120 and a resilient pad 130.

Figure 3:
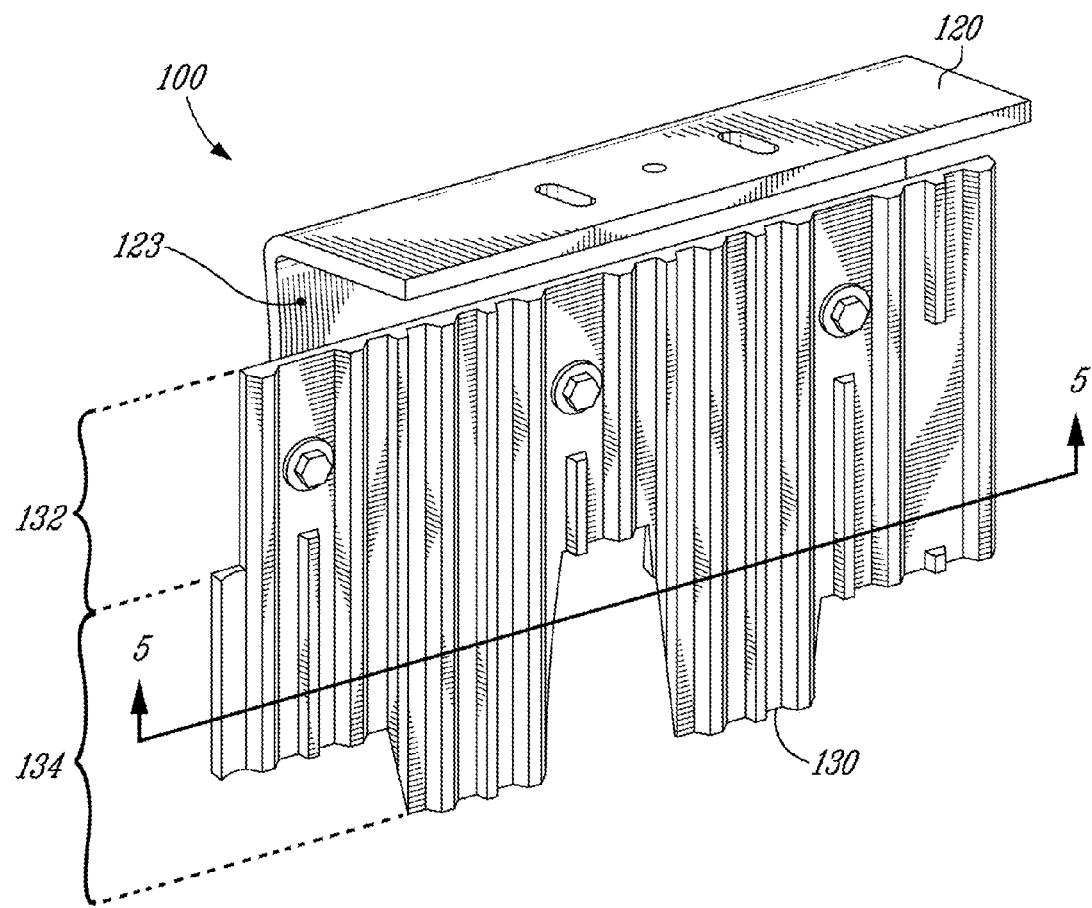
FIG. 3 is an isometric front view of a snow and debris deflector according to the present invention, uninstalled.
Figure 4:
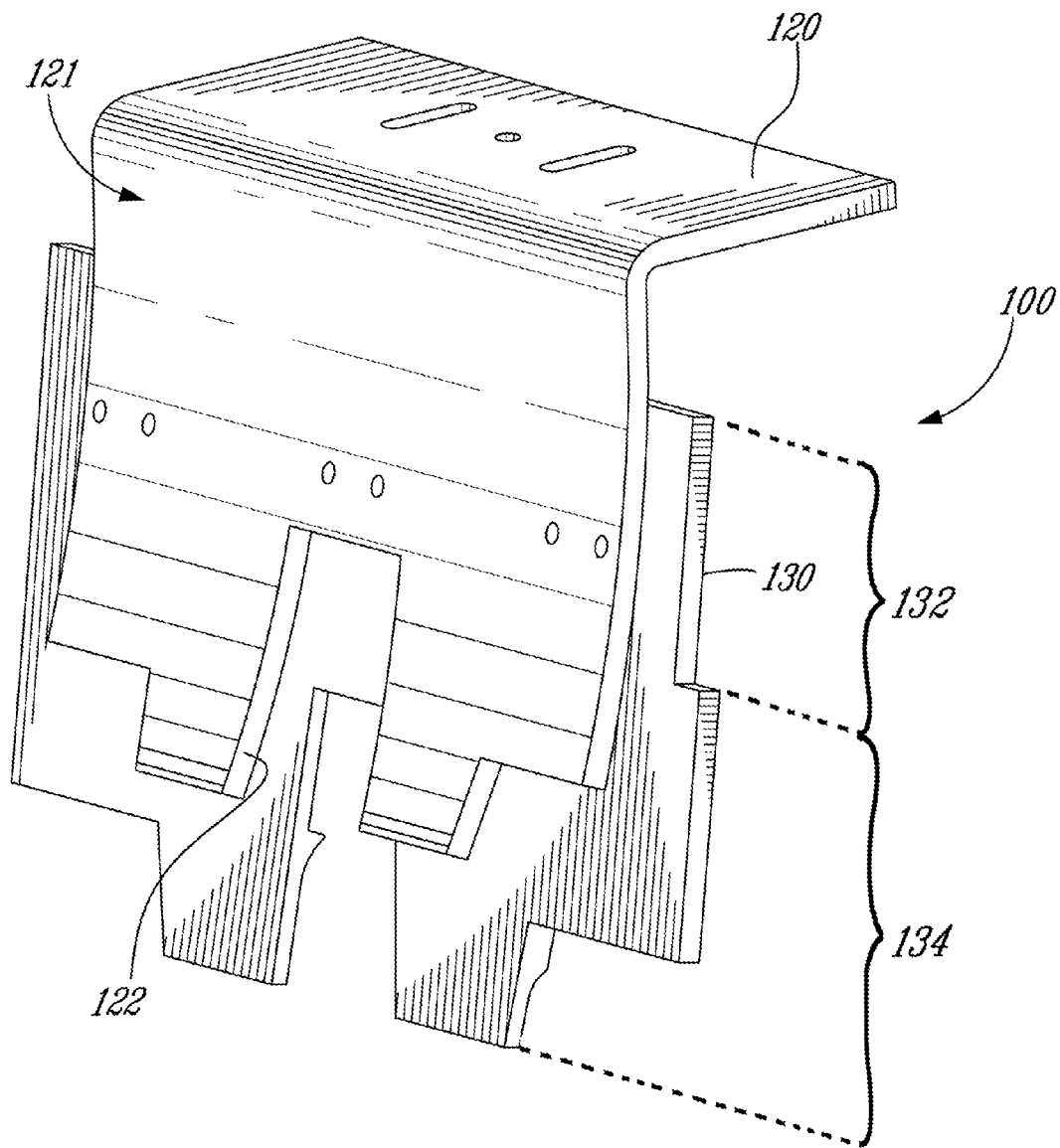
FIG. 4 is an isometric rear view of a snow and debris deflector according to the present invention, uninstalled.
Figure 5:
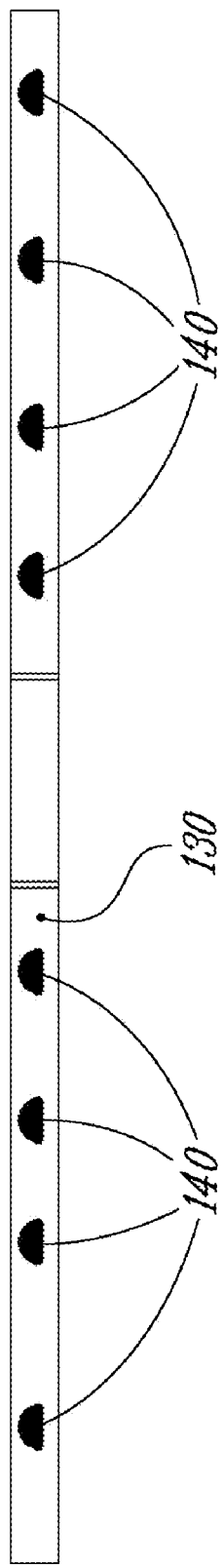
FIG. 5 is a cross-sectional view of the resilient pad along line 5-5 of FIG. 3.
Figure 7:
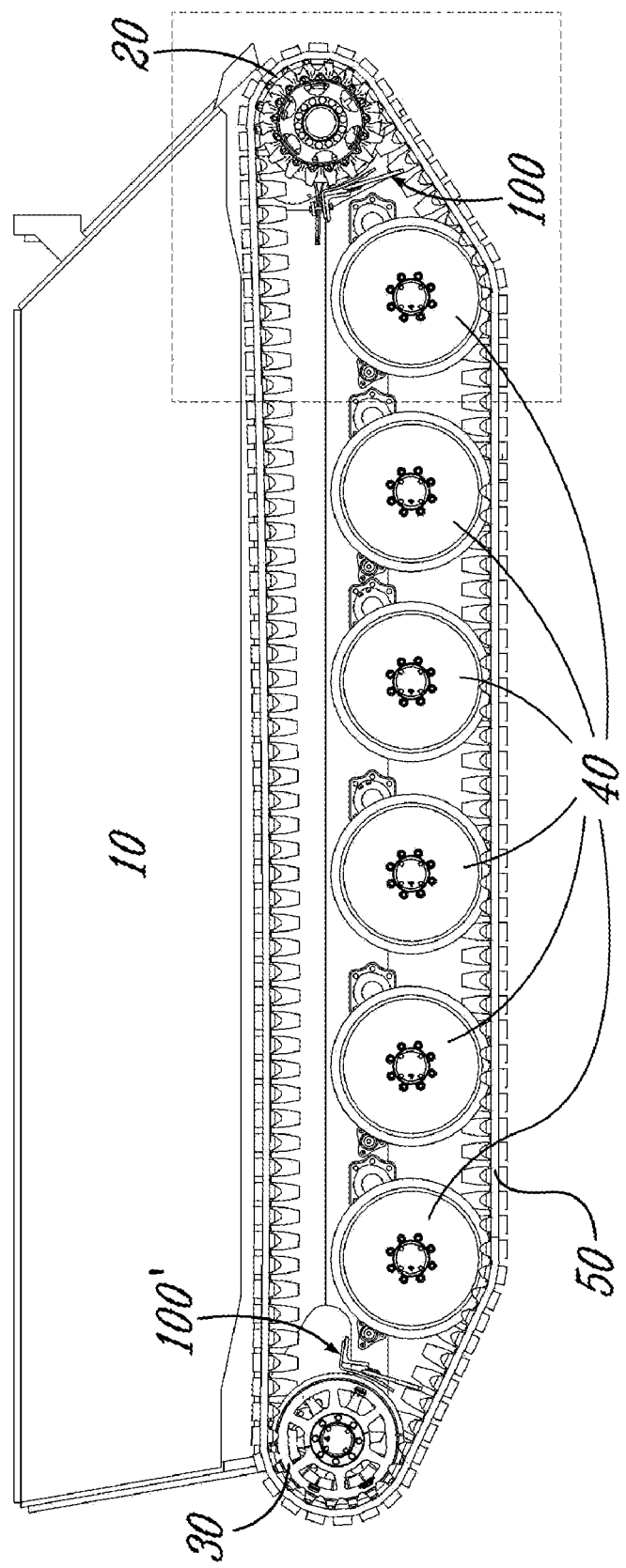
FIG. 7 is a side view of a tracked vehicle equipped with two deflectors in accordance with the present invention, the vehicle being stopped.

The rigid plate 120, which can generally be shaped as an iron angle, is secured to the vehicle 10 and is positioned in a relatively close proximity to the sprocket wheel 20 or idler wheel 30 (see FIG. 7). As seen in FIGS. 3 and 4, the rigid plate 120 defines an inner wheel-facing side 121 and an outer side 123 facing away from the wheel when the deflector is properly installed.

The resilient pad 130 generally comprises an upper portion 132 which is fixedly attached to the plate 120, on the outer side 123 thereof, and a lower portion 134, freely extending downwardly from the upper portion 132, beyond the lower edge 122 of the rigid plate 120 and toward the inner surface 52 of the track 50.

Figure 6:
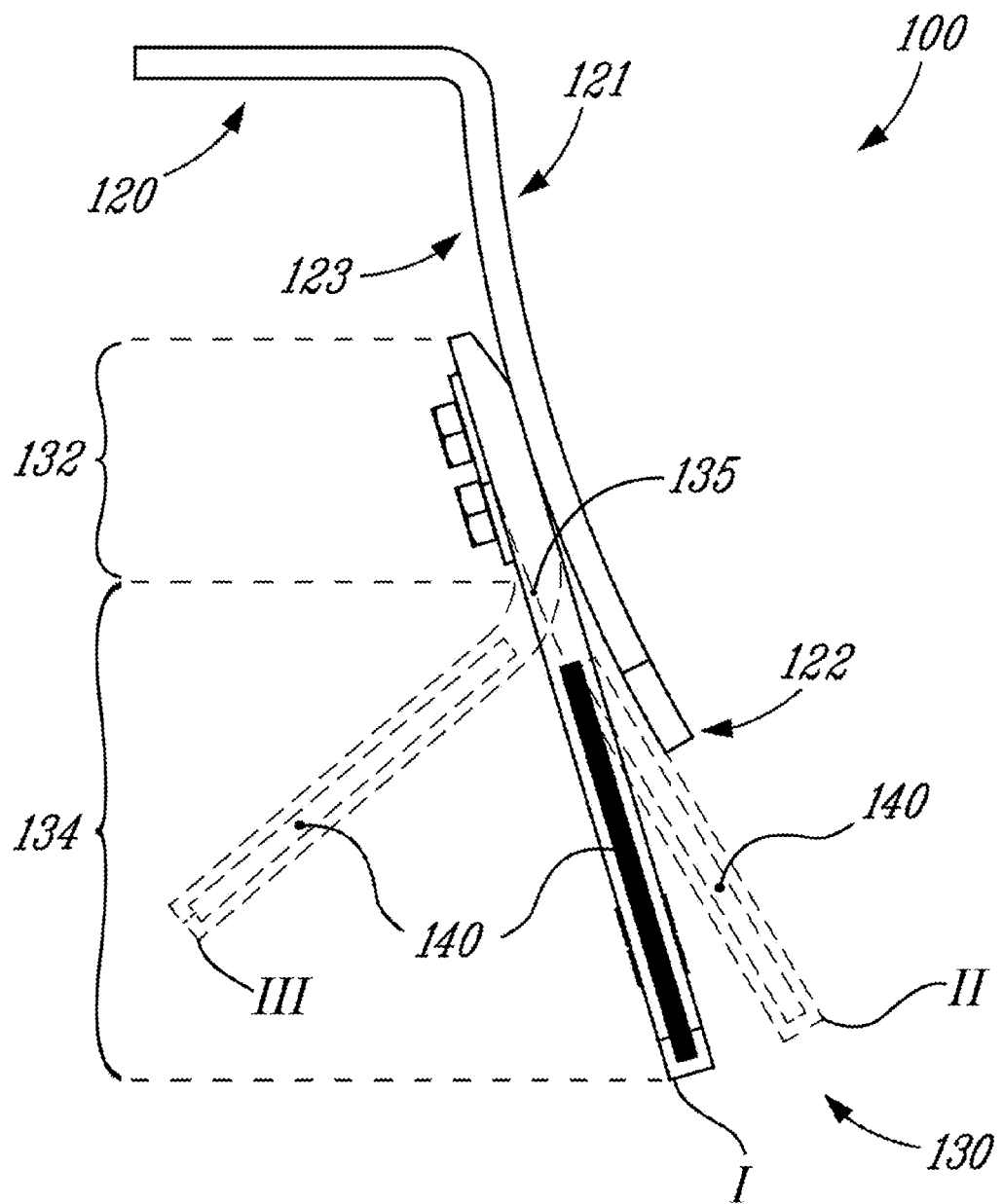
FIG. 6 is a side view of a snow and debris deflector according to the present invention, the resilient pad being shown in three different positions.

The rigid plate 120 is preferably made from steel or other similar rigid material. Also, as best shown in FIGS. 3, 4 and 6, at least a portion of the rigid plate 120 is shaped as an arc. This arcuate shape preferably follows the curvature of the outer periphery of the sprocket wheel 20 or idler wheel 30. Preferably, the rigid plate 120 is designed to avoid any interference with the outer periphery of the sprocket wheel 20 or idler wheel 30 and also with the inner surface 52 of the track 50. Accordingly, the rigid plate 120 is generally spaced from the sprocket wheel 20 or idler wheel 30 outer periphery by a distance ranging between around 0.5 inch (12.5 mm) and 1.5 inch (37.5 mm). Understandably, the exact distance can vary according to different wheel configurations. Additionally, the lower edge 122 of the rigid plate 120 is spaced from the inner surface 52 of the track 50 and preferably has a shape which is generally substantially complementary to the profile of the inner surface 52 of the track 50.

For its part, the resilient pad 130 is preferably made from flexible elastomeric composite material such as, but not limited to, rubber. Understandably, other materials exhibiting similar properties could also be used; the present invention is not so limited.

Referring now to FIGS. 3 to 6, in accordance with the present invention, the resilient pad 130, and more particularly the lower portion 134 thereof, is provided with at least one but preferably a plurality of vertical reinforcing elements 140 which are preferably embedded into the lower portion 134 of the resilient pad 130. As is well understood, these reinforcing elements 140 may assume different configurations (e.g. rods, bars, members, etc.) and a variety of forms and cross-sectional profiles. Also, these reinforcing elements 140 may be made from any suitable material well known in the art; for example, steel, reinforced carbon fibers and reinforced fibreglass. Importantly, the reinforcing elements 140 vertically extend in the lower portion 134 of the resilient pad 130 in such a way that they extend both above and under the lower edge 122 of the rigid plate 120 when the resilient pad 130 is mounted thereto (best shown in FIG. 6). Depending on the exact shape of the resilient pad 130, the length of each reinforcing element 140 can vary and all the reinforcing elements 140 need not to be equal in length. Preferably, but not exclusively, these reinforcing elements 140 are laterally spaced-apart, according, or not, to a predetermined interval.

Referring to FIGS. 1 to 4, the lower portion 134 of the resilient pad 130 generally has a shape which is generally substantially complementary to the profile of the inner surface 52 of the track 50. Understandably, the shape of the lower portion 134 of the resilient pad 130 will vary according to the exact configuration of the inner surface 52 of the track 50.

As shown in FIGS. 3 and 4 and particularly FIG. 6, the resilient pad 130 is mounted to the rigid plate 120 is such a way as to define a hinge portion 135 generally at the junction of the upper portion 132 and the lower portion 134. In accordance with the present invention, the configuration of the hinge portion 135, of the reinforcing elements 140 and of the rigid plate 120 allows the resilient pad 130 to be substantially rigid in the direction of ingestion (position II which corresponds to FIGS. 11 and 12) due to the combined effects of the lower portion 134 of the resilient pad 130 which abuts on the lower edge 122 of the rigid plate 120 and of the reinforcing elements 140 which rigidify the lower portion 134 and prevent the latter from bending around the lower edge 122, but also to be pivotable in the other direction (position III which corresponds to FIGS. 9 and 10) due to the hinge portion 135 and due to the absence of physical constraints (e.g. reinforcing elements 140 and rigid plate 120). Hence, as depicted in FIG. 6 and as explained below, the resilient pad 130, and more particularly its lower portion 134, takes the rigid position, namely position II, only when snow and/or other debris are pushed thereon in the direction of ingestion with respect to the sprocket wheel 20 or idler wheel 30. In the opposite direction, the resilient pad 130, and more particularly its lower portion 134, will be free to pivot about the hinge portion 135.

Figure 9:
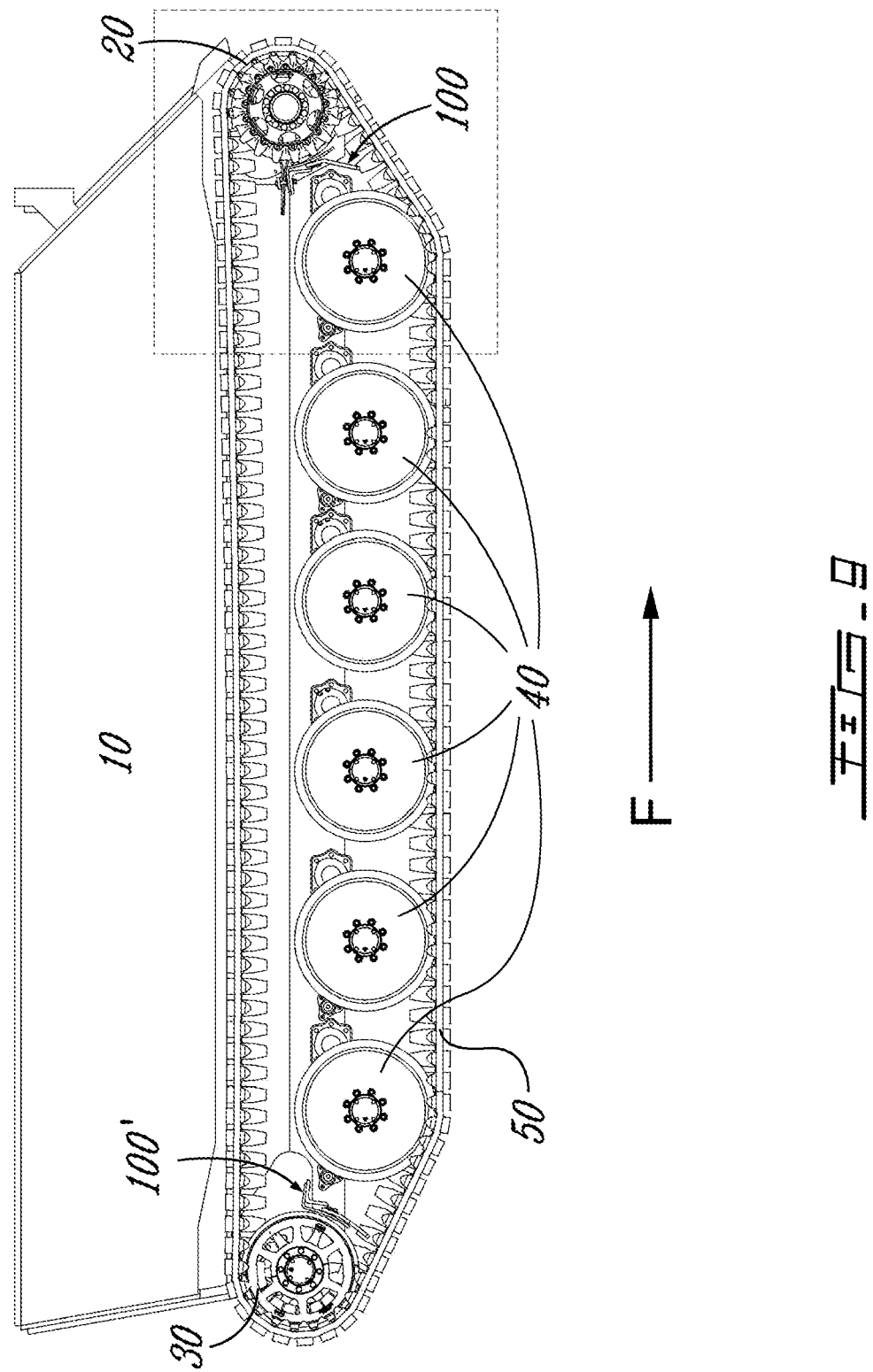
FIG. 9 is a side view of the vehicle of FIG. 7, the vehicle moving in direction F.
Figure 11:
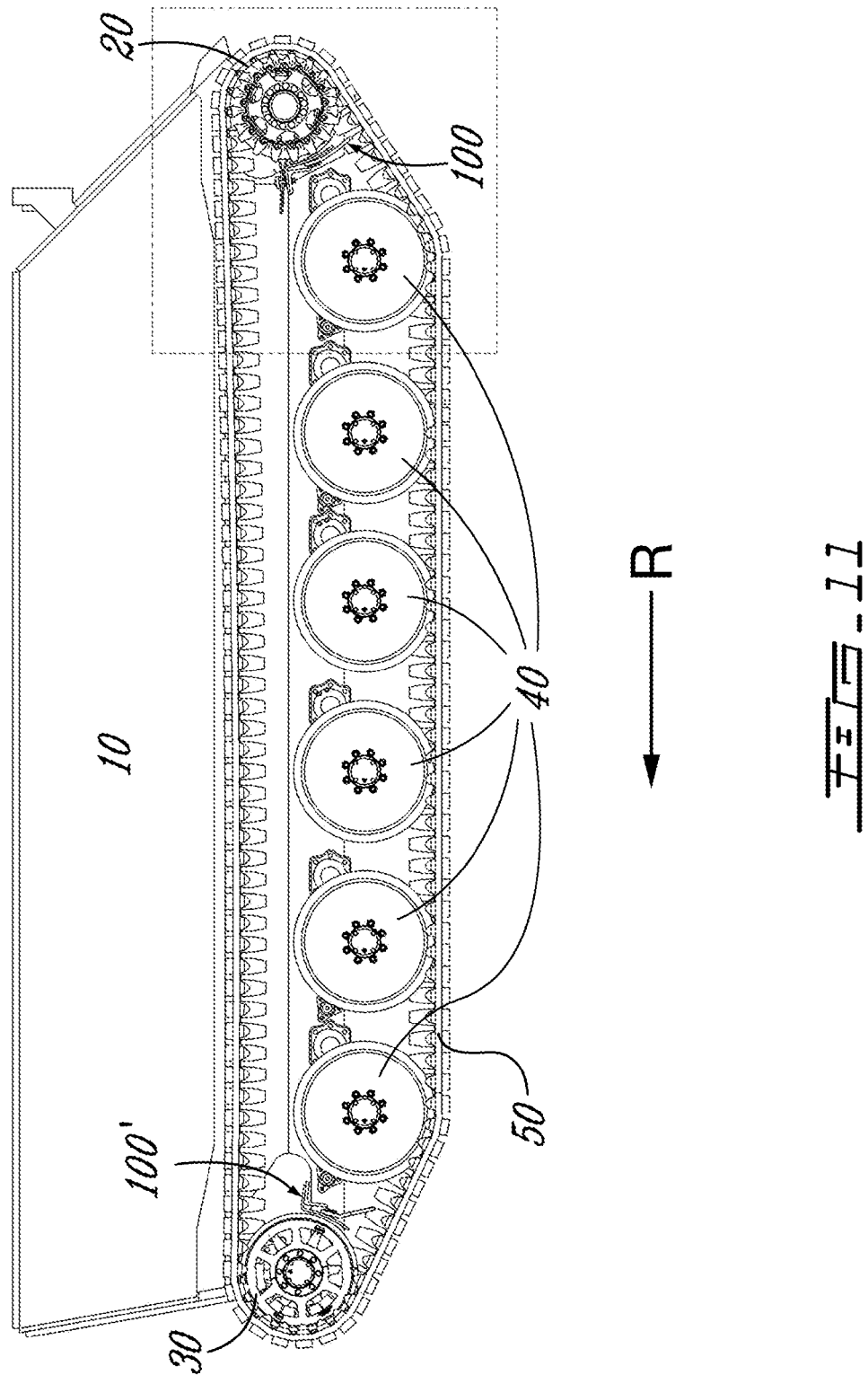
FIG. 11 is a side view of the vehicle of FIG. 7, the vehicle moving in direction R.

Referring now to FIGS. 7, 9 and 11, a tracked vehicle 10 is shown with a first deflector 100 mounted in relation with the sprocket wheel 20 and a second deflector 100' mounted in relation with the idler wheel 30.

Figure 8:
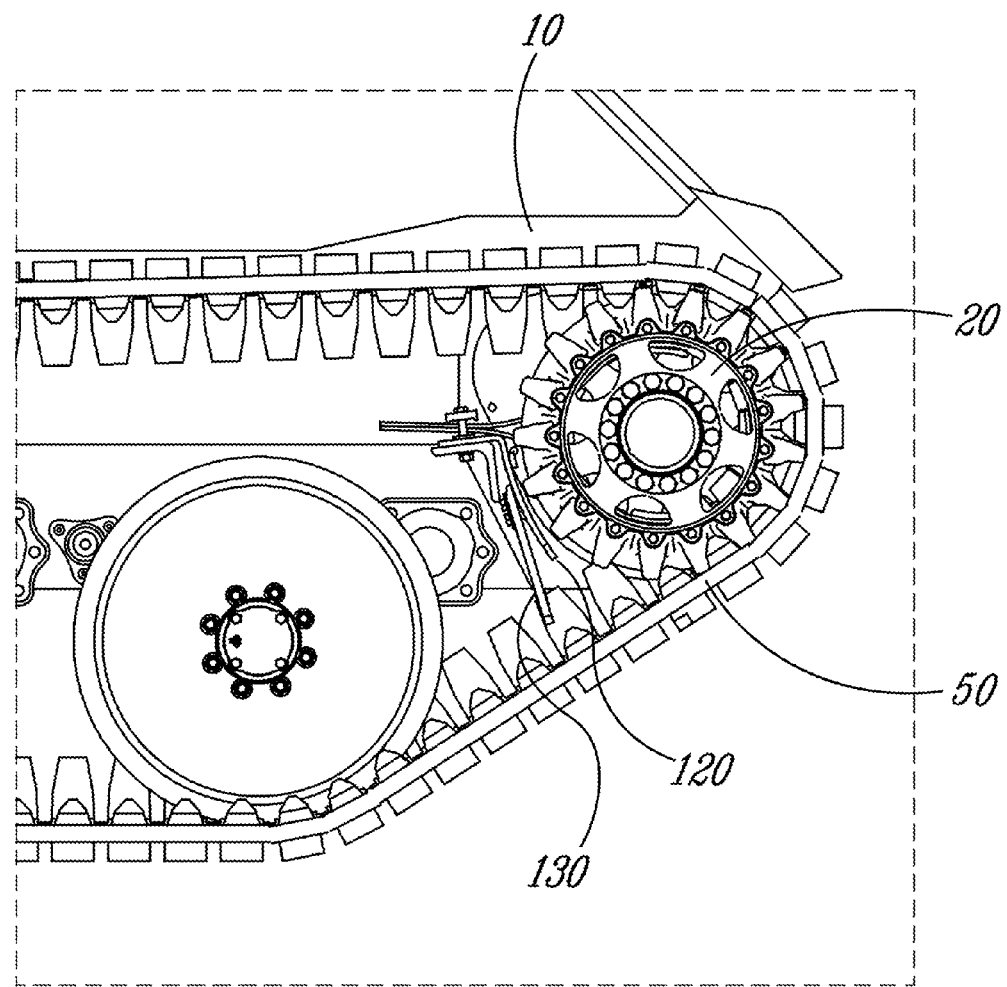
FIG. 8 is a fragmentary and enlarged side view of the front snow and debris deflector shown in FIG. 7 when the vehicle is stopped.

In FIGS. 7 and 8, the vehicle 10 is stopped. In this case, since the resilient pad 130 and more particularly its lower portion 134 is not subjected to any force, except gravity, the resilient pad 130 will freely hang from the rigid plate 120 and will remain in a stable neutral position, namely position I depicted in FIG. 6. Notably, when the vehicle 10 is stopped, a space exists between the lower portion 134 of the resilient pad 130 and the inner surface 52 of the track 50. Thus, the lower portion 134 of the resilient pad 130 is not contact with the inner surface 52 of the track 50 when the vehicle is stopped.

Figure 10:
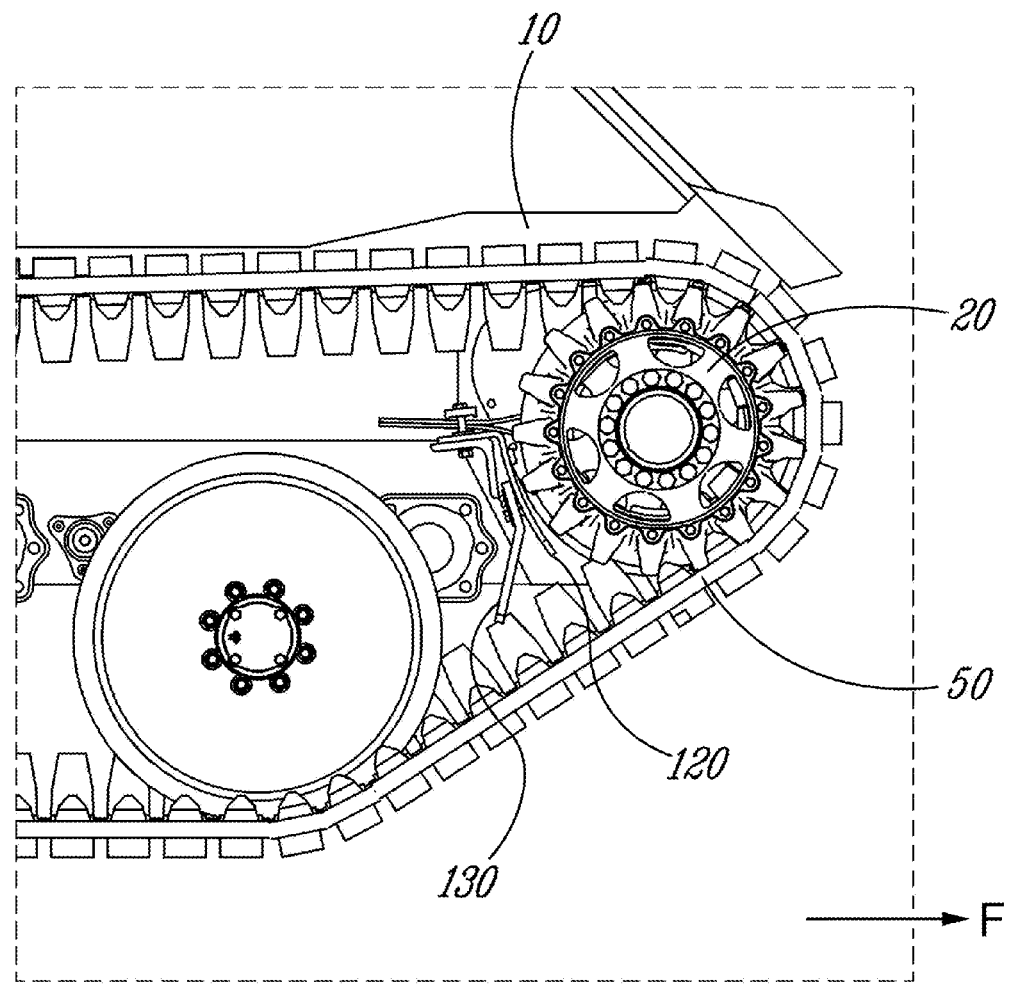
FIG. 10 is a fragmentary and enlarged side view of the front snow and debris deflector shown in FIG. 9 when the vehicle is moving in direction F.

Referring now to FIGS. 9 and 10, when the vehicle 10 moves in a direction F, the track 50 moves in the opposite direction, thus from the sprocket wheel 20, located at the fore of the vehicle 10, toward the idler wheel 30, located at the aft of the vehicle 10. In this situation, with respect to the sprocket wheel 20, the snow and/or the debris located on the inner surface 52 of the track 50 move away from the sprocket wheel 20. In that case, as shown in FIG. 9 and more particularly in FIG. 10, the lower portion 134 of the resilient pad 130 pivots about the hinge portion 135 and moves away from the rigid plate 120 as shown by the position III of FIG. 6, thereby allowing the snow and/or the debris (not shown) located in the sprocket wheel 20 area to move out.

Figure 12:
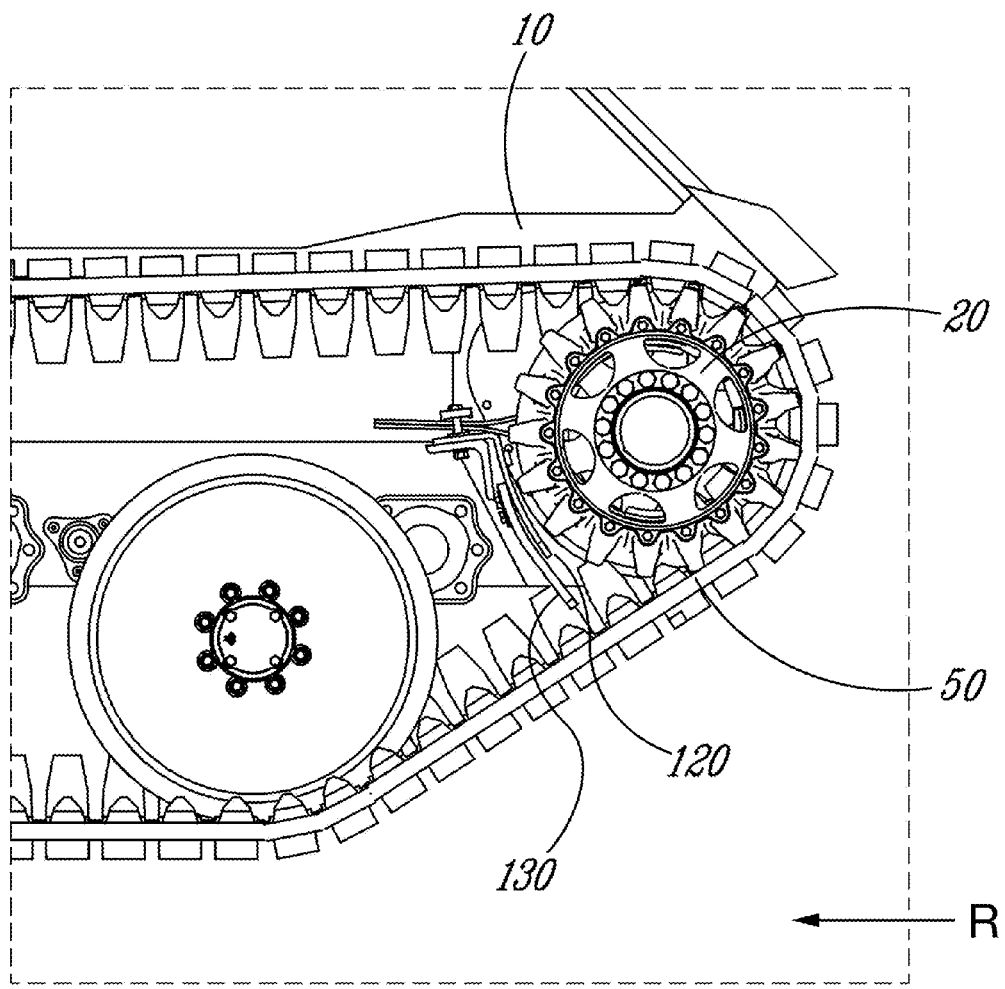
FIG. 12 is a fragmentary and enlarged side view of the front snow and debris deflector shown in FIG. 11 when the vehicle is moving in direction R.

However, referring now to FIGS. 11 and 12, when the vehicle 10 moves in a direction R, the track 50 moves in the opposite direction, thus from the idler wheel 30, located at the aft of the vehicle 10, toward the sprocket wheel 20, located at the fore of the vehicle 10. In this situation, with respect to the sprocket wheel 20, the snow and/or the debris located on the inner surface 52 of the track 50 move toward the sprocket wheel 20, thus in the direction of ingestion. In that case, as shown in FIG. 11 and more particularly in FIG. 12, as snow and/or debris (not shown) come into contact with the lower portion 134 of the resilient pad 130, the lower portion 134 is pushed on the rigid plate 120 and becomes rigid as explained above and as shown by position II in FIG. 6. Once in its rigid position II, the lower portion 134 of the resilient pad 130 effectively blocks and deflects at least a portion of the snow and/or of the debris which are carried on the inner surface 52 of the track 50 and generally prevents or reduces their ingestion by the sprocket wheel 20.

As the skilled addressee would understand, during normal operation of the vehicle 10, due to the general symmetry between the sprocket wheel 20 and the idler wheel 30, when the deflector 100 is in position III as in FIG. 9, the deflector 100' will generally be in position II, whereas when the deflector 100 is in position II as in FIG. 11, the deflector 100' will generally be in position III.

Figure 13:
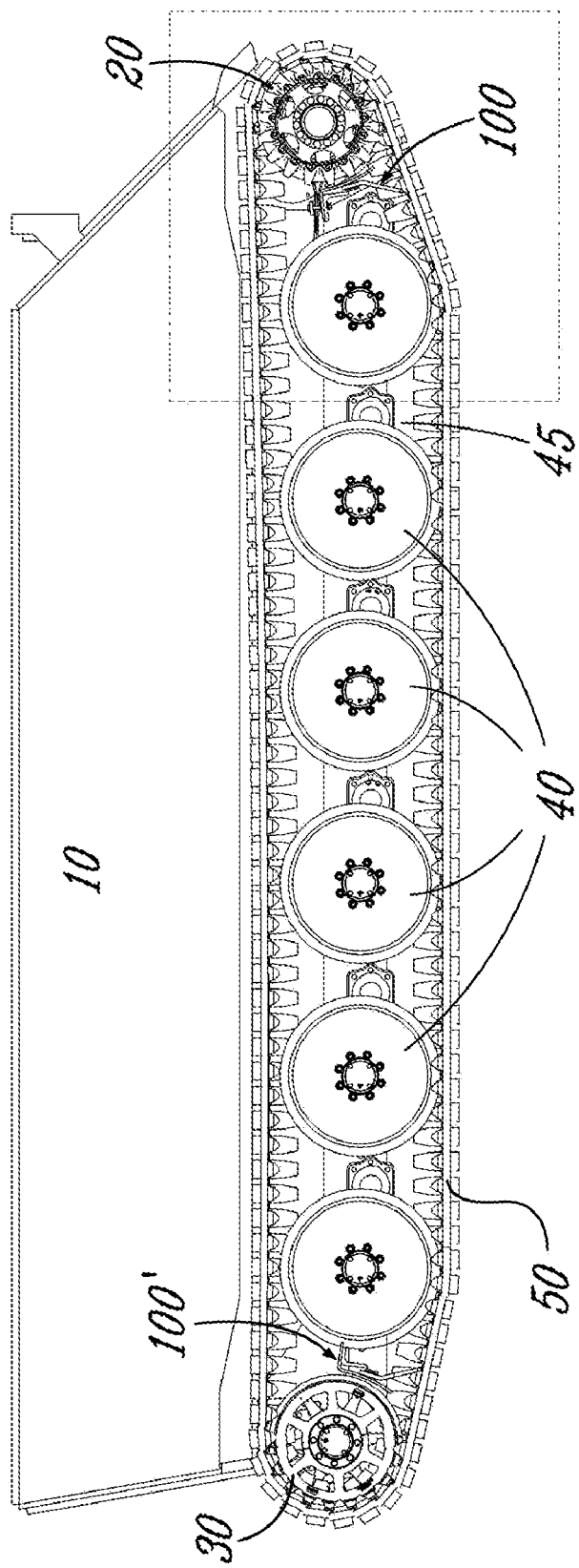
FIG. 13 is a side view of the track system of FIG. 7, the suspension of the road wheels being in compressed position.

Referring now to FIGS. 13 and 14, tracked vehicles such as vehicle 10 are often provided with road wheels 40, each of them provided with a suspension system 45. Accordingly, when the vehicle 10 runs over uneven terrain, the track 50 may move upwardly or downwardly as a result of the upward or downward movements of the road wheels 40. When the track 50 moves upwardly, it can come in contact with the resilient pad 130 and more particularly with its lower portion 134. Since the resilient pad 130 is free to bend or pivot away from the rigid plate 120 due to the hinge portion 135, when the track 50 moves upwardly and contacts the lower portion 134 of the resilient pad 130, the resilient pad 130 and more particularly it lower portion 134 will pivot away from the rigid plate 120, as shown in FIG. 13 and more particularly in FIG. 14, in order to temporarily accommodate the track 50 without damaging it.

Understandably, the rigid plate 120 must be mounted to the vehicle such that its lower edge 122 never comes in direct contact with the inner surface 52 of the track 50 whether the suspension system 45 of the road wheels 40 is extended or compressed to its maximum.

Notably, for the deflector 100 of the present invention to work properly, the latter must generally be installed transversely with respect to the longitudinal direction of the track 50 as best shown in FIG. 1.

Using the snow and debris deflector 100 for a track system according to the present invention allows an effective track system protection without any complex and expensive mechanisms.

Although the present snow and debris deflector 100 for a track system has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

The invention claimed is:

1. A snow and/or debris deflector for a tracked vehicle, said deflector comprising:
   a) a rigid plate configured to be mounted to said vehicle substantially transversely to the longitudinal direction of a track of said vehicle and near one of the wheels of said vehicle, said rigid plate having an inner wheel-facing side, an opposite outer side, and a lower edge;
   b) a resilient pad having an upper portion, mounted on said outer side of said rigid plate, a lower portion, extending from said upper portion and overlapping said lower edge of said rigid plate, and a hinge portion at the junction of said upper portion and said lower portion and about which said lower portion can pivot with respect to said upper portion, said lower portion being provided with at least one reinforcing element embedded therein overlapping said lower edge of said rigid plate such that said lower portion of said resilient pad is prevented from bending around said lower edge of said rigid plate and toward said one of said wheels;
   wherein the combination of said rigid plate, said lower portion of said resilient pad and said at least one reinforcing element causes said lower portion of said resilient pad to abut on said rigid plate and remain substantially rigid when pushed against said rigid plate by snow and/or debris traveling toward said one of said wheels, but causes said lower portion of said resilient pad to pivot about said hinge portion away from said rigid plate when pushed away from said rigid plate by snow and/or debris exiting said one of said wheels.

2. A deflector as claimed in claim 1, wherein said lower portion of said resilient pad comprises a plurality of said at least one reinforcing element.

3. A deflector for reducing the ingestion of snow and/or debris in one of a sprocket wheel and an idler wheel of a vehicle equipped with at least one endless track, said deflector comprising:
   a) a rigid plate configured to be mounted to said vehicle substantially transversely with respect to the longitudinal direction of said at least one track and near one of said sprocket wheel and said idler wheel, said rigid plate having an inner wheel-facing side, an opposite outer side, and a lower edge; and
   b) a resilient pad having an upper portion mounted to said rigid plate on said opposite side, a lower portion downwardly extending from said upper portion and overlapping said lower edge of said rigid plate, and a hinge portion at the junction of said upper portion and said lower portion and about which said lower portion can pivot with respect to said upper portion, said lower portion comprising a plurality of rigid reinforcing elements embedded therein and also overlapping said lower edge of said rigid plate such that said lower portion of said resilient pad is prevented from bending around said lower edge of said rigid plate and toward said one of said sprocket wheel and said idler wheel;
   wherein the combination of said rigid plate, said lower portion of said resilient pad and said reinforcing elements causes said lower portion of said resilient pad to abut on said rigid plate and remain substantially rigid when pushed against said rigid plate by snow and/or debris traveling toward said one of said sprocket wheel and said idler wheel, but causes said lower portion of said resilient pad to pivot about said hinge portion away from said rigid plate when pushed away from said rigid plate by snow and/or debris exiting said one of said sprocket wheel and said idler wheel.

4. A deflector for reducing the ingestion of snow and/or debris between one of a sprocket wheel area and an idler wheel area and a track of a vehicle equipped with at least one track system, said deflector comprising:
   a) a rigid plate adapted to be mounted to said vehicle in close proximity of the outer periphery of said one of said sprocket wheel and said idler wheel and substantially transversally of a longitudinal direction of said track, said rigid plate having an inner wheel-facing side, an opposite outer side, and a lower edge, and being at least partly shaped as an arc substantially following the curvature of said outer periphery of said one of said sprocket wheel and said idler wheel;
   b) a resilient pad having an upper portion mounted on said outer side of said rigid plate, a lower portion extending downwardly from said upper portion and extending below and overlapping said lower edge of said rigid plate, and a hinge portion at the junction of said upper portion and said lower portion and about which said lower portion can pivot with respect to said upper portion; and
   c) a reinforcing element mounted to or embedded within said lower portion of said resilient pad, said element overlapping said lower edge of said rigid plate;
   whereby said lower portion remains substantially rigid when pushed against said rigid plate but pivots about said hinge portion when pushed away from said rigid plate.

5. A deflector as claimed in claim 4, further comprising a plurality of said reinforcing element.

6. A deflector as claimed in claim 4, wherein said reinforcing element extends substantially vertically.

7. A tracked vehicle comprising at least one track system having a sprocket wheel, an idler wheel, road wheels and a longitudinally extending track mounted thereabout, said tracked vehicle comprising a snow and/or debris deflector mounted thereto near one of said wheels, said deflector comprising:
   a) a rigid plate mounted to said vehicle in close proximity of the outer periphery of one of said wheels and substantially transversally of the longitudinal direction of said track, said rigid plate having an inner wheel-facing side, an opposite outer side, and a lower edge, and being at least partly shaped as an arc substantially following the curvature of said outer periphery of said one of said sprocket wheel and said idler wheel;
   b) a resilient pad having an upper portion mounted on said outer side of said rigid plate, a lower portion extending downwardly from said upper portion and overlapping said lower edge of said rigid plate, and a hinge portion at the junction of said upper portion and said lower portion and about which said lower portion can pivot with respect to said upper portion; and c) a reinforcing element mounted to or embedded within said lower portion of said resilient pad, said reinforcing element overlapping said lower edge of said rigid plate;

whereby said lower portion remains substantially rigid when pushed against said rigid plate but pivots about said hinge portion when pushed away from said rigid plate.

8. A tracked vehicle as claimed in claim 7, wherein said deflector further comprises a plurality of said reinforcing element.

9. A tracked vehicle as claimed in claim 7, wherein said lower portion of said resilient pad has a shape which is substantially complementary to the interior profile of said track.

10. A tracked vehicle as claimed in claim 7, wherein said lower edge of said rigid plate has a shape which is substantially complementary to the interior profile of said track.

11. A tracked vehicle as claimed in claim 7, wherein said lower portion of said resilient pad is spaced from the inner surface of said track when said vehicle is stopped.

12. A deflector for reducing the ingestion of snow and/or debris between one of a sprocket wheel area and an idler wheel area and a track of a tracked vehicle equipped with at least one track system, said deflector comprising:

a) a rigid plate configured to be mounted to said vehicle in close proximity of the outer periphery of said one of said sprocket wheel and said idler wheel and substantially transversally of a longitudinal direction of said track, said rigid plate having an inner wheel-facing side configured to face said one of said sprocket wheel and said idler wheel, an opposite outer side, and a lower edge;

b) a resilient pad having an upper portion mounted on said outer side of said rigid plate, a lower portion extending downwardly from said upper portion and extending below and overlapping said lower edge of said rigid plate, and a hinge portion at the junction of said upper portion and said lower portion and about which said lower portion can pivot with respect to said upper portion; and c) a rigid element embedded within said lower portion of said resilient pad, said element overlapping said lower edge of said rigid plate such that said lower portion of said resilient pad is prevented from bending around said lower edge of said rigid plate and toward said one of said sprocket wheel and said idler wheel;

wherein the combination of said rigid plate, said resilient pad and said rigid element causes said lower portion of said resilient pad to abut on said rigid plate and remain substantially rigid when pushed against said rigid plate by snow and/or debris traveling toward said one of said -sprocket wheel area and said idler wheel area, but also cause said lower portion of said resilient pad to pivot about said hinge portion away from said rigid plate when pushed away from said rigid plate by snow and/or debris exiting said one of said sprocket wheel area and said idler wheel area.

13. A deflector as claimed in claim 12, wherein said rigid element extends substantially vertically.

14. A deflector as claimed in claim 12, further comprising a plurality of said rigid element.

15. A deflector as claimed in claim 14, wherein said rigid elements extend substantially vertically.

16. A deflector as claimed in claim 14, wherein at least one of said rigid elements has a length different from any others.

17. A deflector as claimed in claim 14, wherein said rigid elements are laterally spaced-apart.

18. A deflector as claimed in claim 12, wherein said resilient pad is made from composite material.

19. A deflector as claimed in claim 12, wherein said lower portion of said resilient pad has a shape which is substantially complementary to the interior profile of said track.

20. A deflector as claimed in claim 12, wherein at least part of said rigid plate is shaped as an arc substantially following the curvature of said outer periphery of said one of said sprocket wheel and said idler wheel.

21. A deflector as claimed in claim 12, wherein said lower edge of said rigid plate has a shape which is substantially complementary to the interior profile of said track.

22. A deflector as claimed in claim 12, wherein said lower portion of said resilient pad is spaced from the inner surface of said track when said vehicle is stopped.

23. A tracked vehicle comprising at least one track system having a sprocket wheel, an idler wheel, road wheels and a longitudinally extending track mounted about said wheels, said tracked vehicle comprising a snow and/or debris deflector mounted thereto near one of said wheels, said deflector comprising:

a) a rigid plate mounted to said vehicle in close proximity of the outer periphery of one of said wheels and substantially transversally of the longitudinal direction of said track, said rigid plate having an inner wheel-facing side configured to face said one of said wheels, an opposite outer side, and a lower edge;

b) a resilient pad having an upper portion mounted on said outer side of said rigid plate, a lower portion extending downwardly from said upper portion and overlapping said lower edge of said rigid plate, and a hinge portion at the junction of said upper portion and said lower portion and about which said lower portion can pivot with respect to said upper portion; and c) a rigid element embedded within said lower portion of said resilient pad, said rigid element overlapping said lower edge of said rigid plate such that said lower portion of said resilient pad is prevented from bending around said lower edge of said rigid plate and toward. said one of said wheels;

wherein the combination of said rigid plate, said resilient pad and said rigid element causes said lower portion of said resilient pad to abut on said rigid plate and remain substantially rigid when pushed against said rigid plate by snow and/or debris traveling toward said one of said wheels, but to pivot about said hinge portion away from said rigid plate when pushed away from said rigid plate by snow and/or debris exiting said one of said wheels.

24. A tracked vehicle as claimed in claim 23, wherein said deflector further comprises a plurality of said rigid element.

25. A tracked vehicle as claimed in claim 23, wherein said lower portion of said resilient pad has a shape which is substantially complementary to the interior profile of said track.

26. A tracked vehicle as claimed in claim 23, wherein said lower edge of said rigid plate has a shape which is substantially complementary to the interior profile of said track.

27. A tracked vehicle as claimed in claim 23, wherein at least part of said rigid plate is shaped as an arc substantially following the curvature of said outer periphery of said one of said wheels.

28. A tracked vehicle as claimed in claim 23, wherein said lower portion of said resilient pad is spaced from the inner surface of said track when said vehicle is stopped.

* * * * *